US011869177B2

(12) United States Patent
Yamasaki et al.

(10) Patent No.: US 11,869,177 B2
(45) Date of Patent: Jan. 9, 2024

(54) INSPECTION SUPPORT SYSTEM (71) Applicant: iXs Co., Ltd., Kawasaki (JP)

(72) Inventors: Fuminori Yamasaki, Kawasaki (JP); Takashi Karino, Kawasaki (JP)

(73) Assignee: IXS CO., LTD.

( * ) Notice: Subject to any disclaimer, the term of this patent is extended or adjusted under 35 U.S.C. 154(b) by 215 days.

(21) Appl. No.: 17/615,609

(22) PCT Filed: Feb. 28, 2020

(86) PCT No.: PCT/JP2020/008486
§ 371 (c)(1),
(2) Date: Dec. 1, 2021

(87) PCT Pub. No.: WO2020/246085
PCT Pub. Date: Dec. 10, 2020

(65) Prior Publication Data
US 2022/0318978 A1 Oct. 6, 2022

(30) Foreign Application Priority Data
Jun. 3, 2019 (JP) .................................. 2019-103834

(51) Int. Cl.
H04N 23/66 (2023.01)
G06T 7/00 (2017.01)
(Continued)

(52) U.S. Cl.
CPC ....... G06T 7/0002 (2013.01); G01N 21/8851 (2013.01); G05D 1/0094 (2013.01);
(Continued)

(58) Field of Classification Search
CPC ..................... G06T 7/0002; G06T 7/74; G06T 2207/20081; G06T 2207/30244;
(Continued)

(56) References Cited

U.S. PATENT DOCUMENTS 5,520,055 A * 5/1996 Fussinger ........... G01M 5/0033
73/764
2011/0044509 A1* 2/2011 Huang ................... G06T 7/001
382/107

(Continued)

FOREIGN PATENT DOCUMENTS

CN 109671119 A 4/2019
JP 2012-178048 A 9/2012
(Continued)

OTHER PUBLICATIONS

International Search Report (English and Japanese) of the International Searching Authority issued in PCT/JP2020/008486, dated Apr. 7, 2020; ISA/JP (7 pages).
(Continued)

Primary Examiner — Timothy R Newlin
(74) Attorney, Agent, or Firm — Harness, Dickey & Pierce, P.L.C.

(57) ABSTRACT

Provided is an inspection support system capable of improving work efficiency or work accuracy in inspection of structures. A self-traveling apparatus autonomously travels in response to a first travel command based on a first inspection image to a target position, and shoots photographing targets captured in the first inspection image to acquire a second inspection image; and an information processing apparatus extracts, from among the photographing targets captured in the second inspection image, a matched target that matches the photographing target captured in the first inspection image, and correlates the identification information that identifies, in an identifiable manner, the photographing targets that are captured in the first inspection image and are matched to the matched target, with the matched target.

5 Claims, 7 Drawing Sheets (51) Int. Cl.
  *G06T 7/73* (2017.01)
  *G06F 16/53* (2019.01)
  *G06V 10/75* (2022.01)
  *G01N 21/88* (2006.01)
  *G05D 1/00* (2006.01)

(52) U.S. Cl.
  CPC ............. *G06F 16/53* (2019.01); *G06T 7/74* (2017.01); *G06V 10/751* (2022.01); *H04N 23/66* (2023.01); *G01N 2021/8887* (2013.01); *G06T 2207/20081* (2013.01); *G06T 2207/30244* (2013.01)

(58) Field of Classification Search
  CPC ....... G01N 21/8851; G01N 2021/8887; G05D 1/0094; G05D 2201/0207; G06F 16/53; G06V 10/751; H04N 23/66; E01D 22/00; G01M 5/0033; G01M 5/0091
  See application file for complete search history.

(56) References Cited

U.S. PATENT DOCUMENTS

| | | | | |
|---|---|---|---|---|
| 2013/0236084 | A1* | 9/2013 | Li | G01N 21/95607 382/144 |
| 2014/0185911 | A1* | 7/2014 | Steffenson | G06T 7/75 382/141 |
| 2015/0279024 | A1* | 10/2015 | Tsuchiya | G03F 1/84 382/144 |
| 2016/0146971 | A1* | 5/2016 | Gerling | G01V 99/00 702/5 |
| 2016/0231252 | A1* | 8/2016 | Herrmann | G01N 21/8851 |
| 2016/0327946 | A1 | 11/2016 | Koga et al. | |
| 2016/0370300 | A1* | 12/2016 | Ogawa | G03F 1/84 |
| 2017/0277196 | A1 | 9/2017 | Nakamura et al. | |
| 2018/0170540 | A1* | 6/2018 | Claybrough | G05D 1/104 |
| 2019/0017895 | A1* | 1/2019 | Tsai | G01M 5/0025 |
| 2019/0043182 | A1* | 2/2019 | Wang | G06T 7/001 |
| 2019/0114725 | A1* | 4/2019 | Neuenschwander | B64C 39/02 |
| 2019/0259145 | A1* | 8/2019 | Kong | G06N 5/01 |
| 2019/0370950 | A1* | 12/2019 | Fang | G06T 11/00 |
| 2021/0197625 | A1* | 7/2021 | Laperle | B60C 11/246 |
| 2021/0222540 | A1* | 7/2021 | Kroczka | G01M 11/086 |
| 2021/0358102 | A1* | 11/2021 | Zhao | G06T 7/0002 |

FOREIGN PATENT DOCUMENTS

| | | |
|---|---|---|
| JP | 2013-164754 A | 8/2013 |
| JP | 2015-111111 A | 6/2015 |
| JP | 2016-211973 A | 12/2016 |
| JP | 2017-045480 A | 3/2017 |
| JP | 2017-093626 A | 6/2017 |
| JP | 2017-174377 A | 9/2017 |
| JP | 6365799 B2 | 8/2018 |
| JP | 2019-009919 A | 1/2019 |
| JP | 2019-070631 A | 5/2019 |
| TW | 2015-30120 A | 8/2015 |
| WO | 2015-004739 A1 | 1/2015 |

OTHER PUBLICATIONS

Extended European Search Report issued for the corresponding European Patent Application No. 20819473.8; dated May 27, 2022 (total 10 pages).

* cited by examiner

INSPECTION SUPPORT SYSTEM

CROSS REFERENCE TO RELATED APPLICATIONS

This application is a U.S. National Phase Application under 35 U.S.C. 371 of International Application No. PCT/JP2020/008486, filed on Feb. 28, 2020, which claims priority to Japanese Patent Application No. 2019-103834, filed on Jun. 3, 2019. The entire disclosures of the above applications are expressly incorporated by reference herein.

BACKGROUND

Technical Field

This invention relates to an inspection support system.

Related Art

During the high economic growth period in Japan, great numbers of buildings were constructed in association with social infrastructure construction such as highway and railway network. Deterioration over time of these buildings have, however, recently emerged as a social problem.

Periodical inspection and maintenance of concerned buildings are essential to avoid accidents due to the deterioration over time. Meanwhile, workers engaged in huge volume of inspection have been declining year by year, due to severe business environment or due to social environment such as declining birthrate and increasing elderly population.

In consideration of such circumferences, the present inventors have filed an invention of JP-A-2015-111111, regarding an inspection support system used in this field.

The invention of JP-A-2015-111111 relates to an inspection robot that can autonomously travel to acquire various inspection data regarding inspection of the structures, and an inspection support system that collects inspection data with use of the inspection robot.

Since the inspection robot can autonomously collect the inspection data even at places where the worker can hardly travel, so that this invention can improve efficiency of inspection of the structures.

The inspection robot described in JP-A-2015-111111, although enabling autonomous control of the inspection robot, can however enjoy only a limited degree of accuracy, and is difficult to repetitively photograph a structure to be inspected at the same angle (for example, to photograph the same place every time a periodic inspection is held periodically).

This would have degraded inspection efficiency or would have induced inspection mistake, leaving a room for further improvement in the invention described in JP-A-2015-111111.

This invention was arrived at in consideration of the aforementioned problems, aimed at providing an inspection support system capable of improving work efficiency or work accuracy in inspection of the structures.

SUMMARY

According to this invention, there is provided an inspection support system that acquires an inspection image by using a self-traveling apparatus which is designed to be self-travelable in response to a received travel command, and has mounted thereon a photographing unit for photographing an inspection image used for inspection of a structure, and stores the acquired inspection image into a database, the system include:

an image processing unit that extracts, from the inspection image to be stored into the database, one or a plurality of photographing targets captured in the inspection image;

an identification information processing unit that correlates identification information, which identifies each of the extracted photographing targets in an identifiable manner, with the photographing targets, a retrieval unit that retrieves a first inspection image, from among the inspection images stored in the database; and a command generation unit that generates a first travel command that makes the self-traveling apparatus run to a target position where the photographing target, captured in the first inspection image retrieved by the retrieval unit, can be shot;

the self-traveling apparatus autonomously traveling in response to the received first travel command to the target position, and shooting the photographing targets captured in the first inspection image, to acquire a second inspection image, the image processing unit extracting, from among the photographing targets captured in the second inspection image, a matched target that matches the photographing targets captured in the first inspection image, and the identification information processing unit correlating the identification information of the photographing targets captured in the first inspection image matched to the matched target, with the matched target.

According to this invention, an image preliminarily captured and stored in the database (first inspection image) and an image captured later (second inspection image) are compared, and if mutually matched photographing target is found to be captured, information (identification information) for identifying the preliminarily-shot photographing target is correlated with the later-shot photographing target.

Hence, even if the preliminarily-shot photographing target and the later-shot target have been shot at different angles, an inspector is no longer necessary to determine whether the photographing targets are same or different, making it possible to improve work efficiency or work accuracy in inspection.

Advantageous Effects of Invention

According to this invention, there is provided an inspection support system capable of improving work efficiency or work accuracy in inspection of the structures.

BRIEF DESCRIPTION OF THE DRAWINGS

FIG. 6(*a*) is a drawing illustrating a shooting range of the inspection image, and FIG. 6(*b*) is a drawing illustrating photographing targets captured in the inspection image.

FIG. 7(*a*) is a drawing illustrating a shooting range of the inspection image, and FIG. 7(*b*) is a drawing illustrating photographing targets captured in the inspection image.

DETAILED DESCRIPTION

Embodiments of this invention will be explained below referring to the attached drawings. Note that, in all drawings, all similar constituents will be given same reference signs in order to suitably avoid redundant explanations.

<System Configuration of Inspection Support System 10>

First, a system configuration of an inspection support system 10 will be explained.

Figure 1:
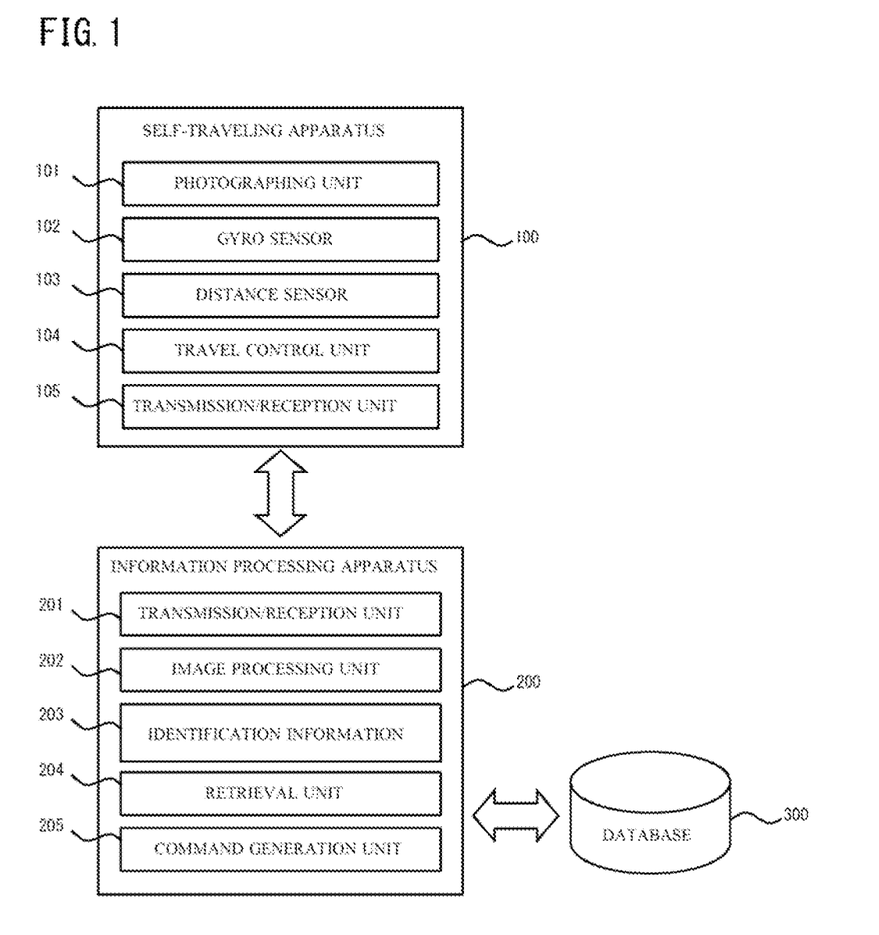
FIG. 1 is a configuration chart of an inspection support system according to an embodiment of this invention.

FIG. 1 is a configuration chart of an inspection support system 10 according to an embodiment of this invention.

As illustrated in FIG. 1, the inspection support system 10 has a self-traveling apparatus 100, an information processing apparatus 200, and a database 300.

The inspection support system 10 is designed to make the self-traveling apparatus 100 acquire image data, to make the information processing apparatus 200 execute a predetermined process of the image data acquired by the self-traveling apparatus 100, and to make the database 300 store the image data having gone through the predetermined process.

The image data acquired by the self-traveling apparatus 100 is used for inspecting a structure. The structure herein means not only usual buildings, but also road, bridge, factory (plant), dam, embankment and so forth.

In the explanation below, the image data acquired by the self-traveling apparatus 100 will be referred to as "inspection image" for the convenience.

The self-traveling apparatus 100 is designed to self-travelable in response to a travel command received from the information processing apparatus 200. Now self-travelable means that the apparatus has a mechanism enabling unmanned travel.

The self-traveling apparatus 100 has mount thereon a photographing unit 101, a gyro sensor 102, a distance sensor 103, a travel control unit 104, and a transmission/reception unit 105.

The photographing unit 101 is a device that shoots an object residing around the self-traveling apparatus 100 (referred to as "photographing target", hereinafter), and is so-called camera. The photographing unit 101 is not limited to a device capable of capturing still image, and instead may be a device capable of capturing video.

The gyro sensor 102 detects a direction the photographing unit 101 faces, that is, a direction allowed for photographing.

The distance sensor 103 measures distance from the photographing unit 101 to the photographing targets.

Note that although FIG. 1 illustrates the photographing unit 101 separately from the gyro sensor 102 and the distance sensor 103, these components may alternatively be embodied as an integrated apparatus.

The travel control unit 104 controls travel of the self-traveling apparatus 100.

By the way, the SLAM (simultaneous localization and mapping) is widely known as a technique for making a moving body autonomously travelable.

Now, SLAM is a technique for enabling something (autonomous mobile robot) to autonomously travel while avoiding obstacles, by estimating an own position relative to the peripheral environment, on the basis of image or information detected by a sensor. Use of SLAM enables preparation of map data (three-dimensional point cloud data) of the peripheral environment, concurrently with the autonomous travel.

Travel control (travel control unit 104) of the self-traveling apparatus 100, although on the premise of use of the SLAM technique in this embodiment, may alternatively be enabled by using any other technique.

The transmission/reception unit 105 receives various data from the information processing apparatus 200, and transmits the various data to the information processing apparatus 200. For example, the transmission/reception unit 105 can receive a travel command from the information processing apparatus 200, and can transmit an inspection image to the information processing apparatus 200.

The information processing apparatus 200 stores the inspection image received from the self-traveling apparatus 100 into the database 300. The information processing apparatus 200 may be embodied by a general purpose personal computer, or may be embodied by a computer specialized for the inspection support system 10.

The information processing apparatus 200 has a transmission/reception unit 201, an image processing unit 202, an identification information processing unit 203, a retrieval unit 204, and a command generation unit 205.

The transmission/reception unit 201 receives various data from the self-traveling apparatus 100, and transmits the various data to the self-traveling apparatus 100.

For example, the transmission/reception unit 201 can receive inspection image from the self-traveling apparatus 100, and can transmit a travel command to the self-traveling apparatus 100.

The image processing unit 202 implements various types of image processing of the inspection image to be stored into the database 300.

For example, the image processing unit 202 can implement image processing for extracting one or a plurality of photographing targets captured in the inspection image, or image processing for discriminating whether the extracted photographing target represents a deteriorated part occurred in a structure or not.

The identification information processing unit 203 correlates information that identifies each of the photographing targets, extracted by the image processing unit 202, in an identifiable manner (referred to as "identification information", hereinafter) with the photographing target.

Now, the identification information typically encompasses not only identification information freely determined for every photographing target, but also unique information for objectively determining the photographing target (for example, position or range in which the photographing target resides).

The retrieval unit 204 retrieves a specific inspection image that satisfies a certain retrieval condition, from among the inspection images stored in the database 300. The condition used by the retrieval unit 204 for retrieval is not specifically limited, and may be freely determined by the user, or may be preliminarily determined.

In the explanation below, the inspection image retrieved by the retrieval unit 204 for the purpose of generating the travel command to be transmit to the self-traveling apparatus 100 will be referred to as "first inspection image" for the convenience. Meanwhile the inspection image acquired by the self-traveling apparatus 100 that travels in response to the travel command may occasionally be referred to as "second inspection image" for mutual discrimination.

The command generation unit 205 generates a travel command (referred to as "first travel command", hereinafter) for making the self-traveling apparatus autonomously travel to a target position where the photographing target captured in the first inspection image retrieved by the retrieval unit 204 can be shot.

Now "the target position where the photographing target captured in the first inspection image can be shot" means, for example, a position where the self-traveling apparatus 100 resided (more strictly, a position where it was supposed to reside) when the first inspection image was captured. The position, however, does not always necessarily coincide with the target position.

As explained above, the inspection support system 10 is understood to be an apparatus that acquires an inspection image by using a self-traveling apparatus which is designed to be self-travelable in response to a received travel command, and has mounted thereon a photographing unit for photographing an inspection image used for inspection of a structure, and stores the acquired inspection image into a database 300.

The inspection support system 10 is also understood to be an apparatus having the image processing unit 202, the identification information processing unit 203, the retrieval unit 204, and the command generation unit 205 of this invention.

<Collection of Inspection Image by Self-Traveling Apparatus 100>

Next, collection of the inspection images by the self-traveling apparatus 100 will be explained.

Figure 2:
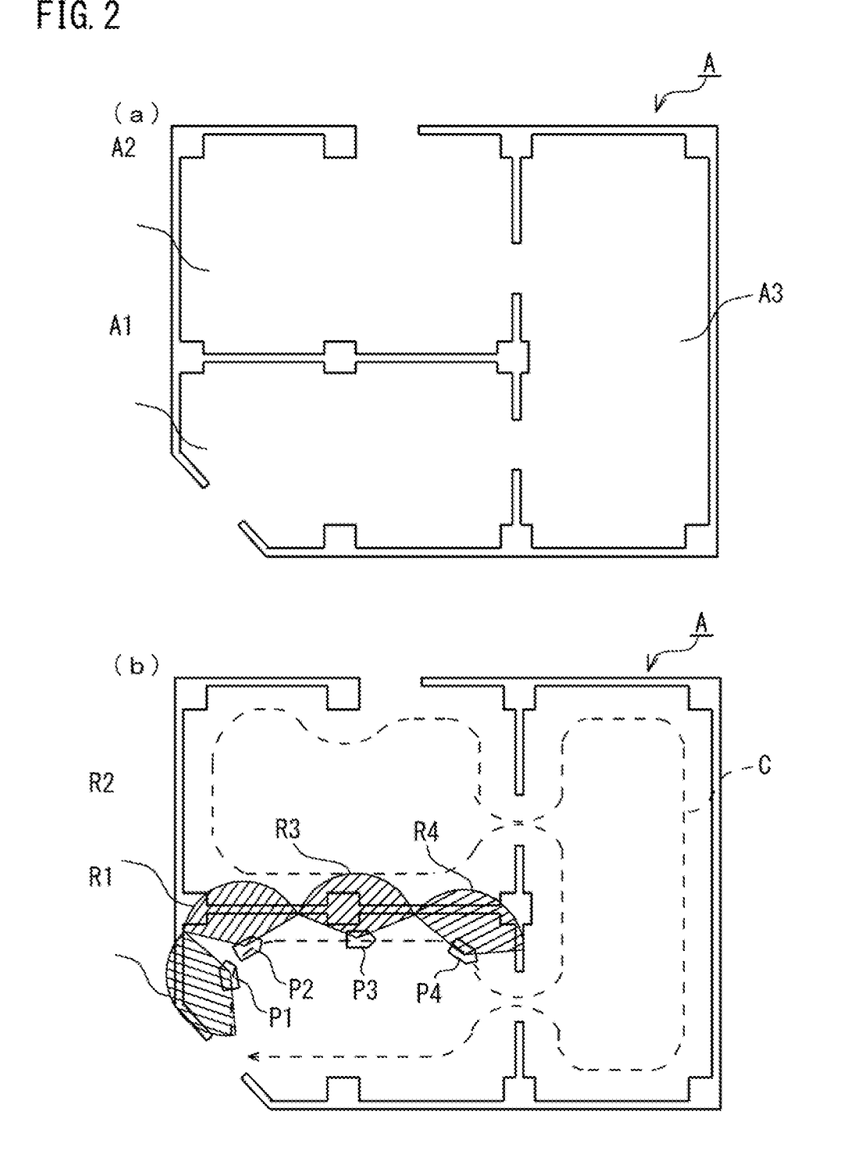
FIG. 2(a) is a plan view illustrating a structure to be inspected.
FIG. 2(b) is a drawing illustrating a travel route of a self-traveling apparatus that inspects the structure A.

FIG. 2(a) is a plan view illustration a structure A to be inspected, and FIG. 2(b) is a drawing illustrating a travel route C of the self-traveling apparatus 100 that inspects the structure A.

Note that the travel route C illustrated in FIG. 2(b) is merely one specific example, allowing that, in implementation of this invention, the self-traveling apparatus 100 collects the inspection images of the structure A along a route different from the travel route C.

As illustrated in FIG. 2(a), the structure A is divided into three spaces (space A1, space A2 and space A3) by a plurality of pillars, and walls provided between the pillars.

When inspecting the structure A, the self-traveling apparatus 100 comprehensively shoots the walls while traveling along the walls, to collect inspection images for all walls of the structure A.

In more detail, the self-traveling apparatus 100 shoots the wall in region R1 which can be captured at certain position P1, then travels to position P2 in the next, and shoots the wall in region R2 which can be captured from position P2. The self-traveling apparatus 100 in this process determines position P2, to which the self-traveling apparatus 100 travels, and the shooting direction of the photographing unit 101, so that ends of region R1 and region R2 can connect seamlessly or can overlap. The self-traveling apparatus 100 repeats similar processes also when it travels from position P2 to next position P3 to photograph the wall in region R3 from position P3, and also when it travels from position P3 to next position P4 to photograph the wall in region R4 from position P4, whereby the inspection images can be shot for all walls of the structure A without omission.

When photographing the inspection images, the self-traveling apparatus 100 correlates time information that indicates the point in time, position information that indicates an own position estimated at that point in time, vector information that indicates shooting direction of the inspection image detected by the gyro sensor 102, and distance information that indicates the distance from the photographing unit 101 to the wall measured by the distance sensor 103, with the inspection image.

The information processing apparatus 200 maps the walls of the structure A as three-dimensional point cloud data, according to arithmetic processing with use of the inspection image acquired by the self-traveling apparatus 100, and the information group correlated with the inspection images. Any of known technologies regarding SLAM is applicable to the arithmetic processing, without special limitation on techniques therefor.

Figure 3:
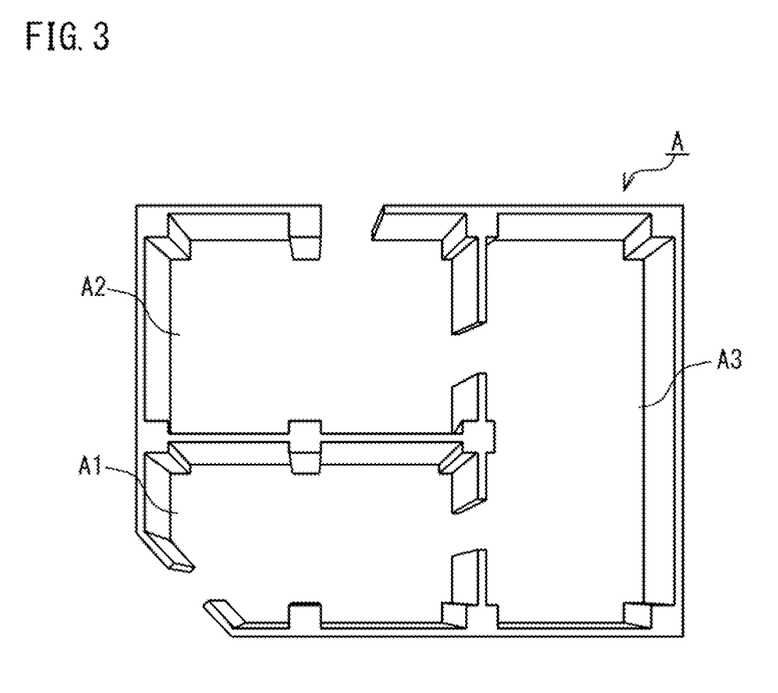
FIG. 3 is a schematic drawing visualizing three-dimensional data mapped by an information processing apparatus.

FIG. 3 is a schematic drawing visualizing three-dimensional point cloud data (map data of the structure A) mapped by the information processing apparatus 200.

As illustrated in FIG. 3, the information processing apparatus 200 can three-dimensionally analyze the constitution of the structure, by deriving the three-dimensional point cloud data as explained above.

The information processing apparatus 200 may also display the constitution of the structure A in a three-dimensional expression as illustrated in FIG. 3, on an unillustrated display unit.

Figure 4:
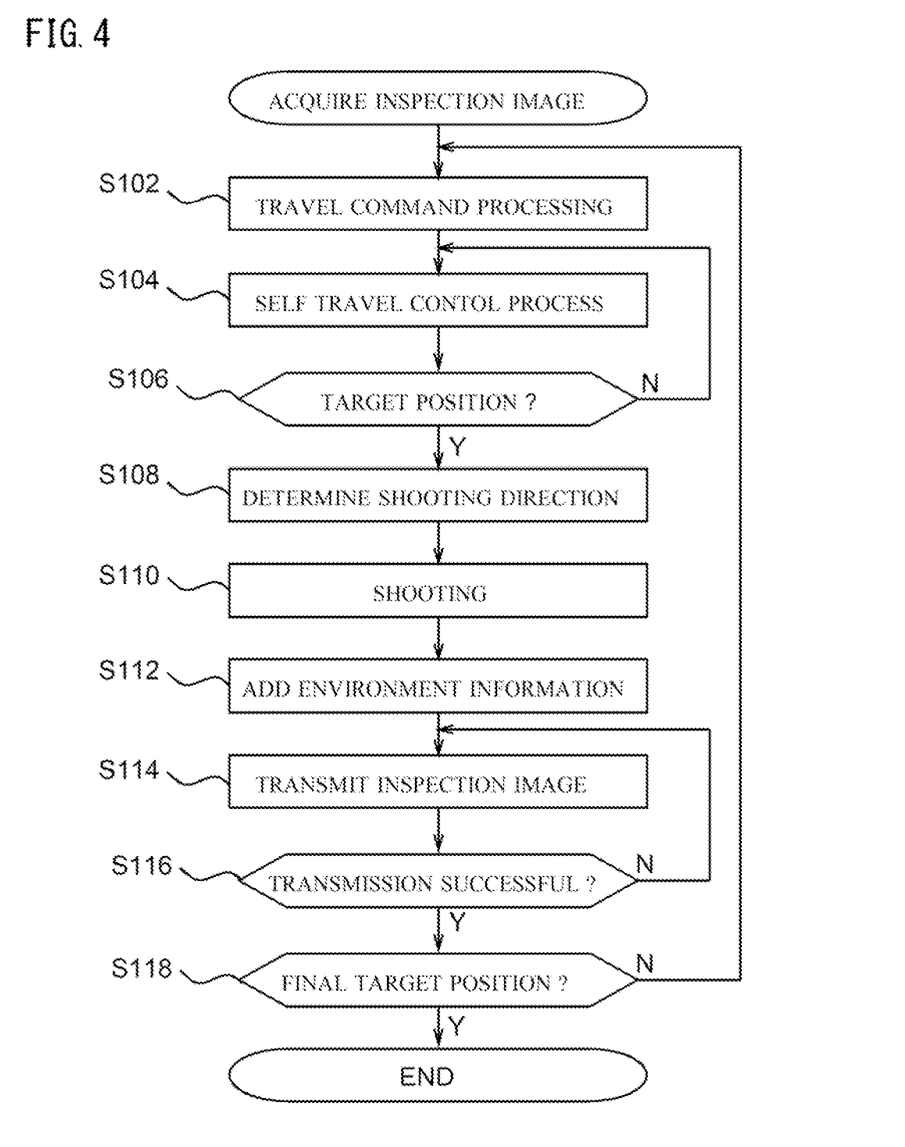
FIG. 4 is a flow chart illustrating processing procedures of the self-traveling apparatus that acquires an inspection image.

FIG. 4 is a flowchart illustrating processing procedures of the self-traveling apparatus 100 that acquires an inspection image.

In step S102, the self-traveling apparatus 100 requests the information processing apparatus 200 to issue the travel command, and receives the travel command from the information processing apparatus 200.

The travel command received in step S102 contains information that indicates a target position to be reached next, or information from which the target position can be calculated. On the basis of the travel command, the self-traveling apparatus 100 can recognize the next target position.

In step S104, the self-traveling apparatus 100, if in the initial state (not having acquired map data of the structure A yet), autonomously travels to the next target position, while estimating the own position by measuring the own position relative to the wall of the structure A. Alternatively, the self-traveling apparatus 100, if already having acquired map data of the structure A, autonomously travels to the next target position, on the basis of the map data.

The autonomous travel control in step S104 is maintained until the self-traveling apparatus 100 arrives at the next target position (over the duration where step S106 remains NO). Upon arrival of the self-traveling apparatus 100 at the next target position (step S106 turns YES), the flow advances to the process of step S108.

In step S108, the self-traveling apparatus 100 determines shooting direction of the photographing unit 101. In this process, the shooting direction is determined as described above, so that the region having been shot in the previous target position and the region planned to be shot this time can connect seamlessly or can overlap.

In step S110, the self-traveling apparatus 100 allows shooting by the photographing unit 101 in the shooting direction determined in step S108.

In step S112, the self-traveling apparatus 100 adds environment information to the inspection image shot in step S110. Now the environment information is a group of information including time information that indicates point in time of shooting, position information that indicates an estimated own position of the self-traveling apparatus 100 at the point in time of shooting, vector information that indicates shooting direction, and distance information that indicates distance from the photographing unit 101 to the wall.

In step S114, the self-traveling apparatus 100 transmits the inspection image having the environment information added thereto, to the information processing apparatus 200.

If the transmission in step S114 succeeded (YES in step S116), the flow advances to the process of step S118, meanwhile if the transmission in step S114 failed (NO in step S116), the transmission in step S114 is retried.

Now, success/failure in step S114 may alternatively be determined on the basis of, for example, whether an ACK command was received from the information processing apparatus 200 in response.

If the estimated own position of the self-traveling apparatus 100 at the point in time of step S118 was found to be the final target position (YES in step S118), collection of the inspection image by the self-traveling apparatus 100 comes to the end.

On the other hand, if the estimated own position of the self-traveling apparatus 100 at the point in time of step S118 was not found to be the final target position (NO in step S118), the flow advances to step S102, and the self-traveling apparatus 100 requests the information processing apparatus 200 to issue a travel command used for determining a new target position.

<Storage of Inspection Image by Information Processing Apparatus 200>

Next, storage of the inspection image by the information processing apparatus 200 will be explained.

Figure 5:
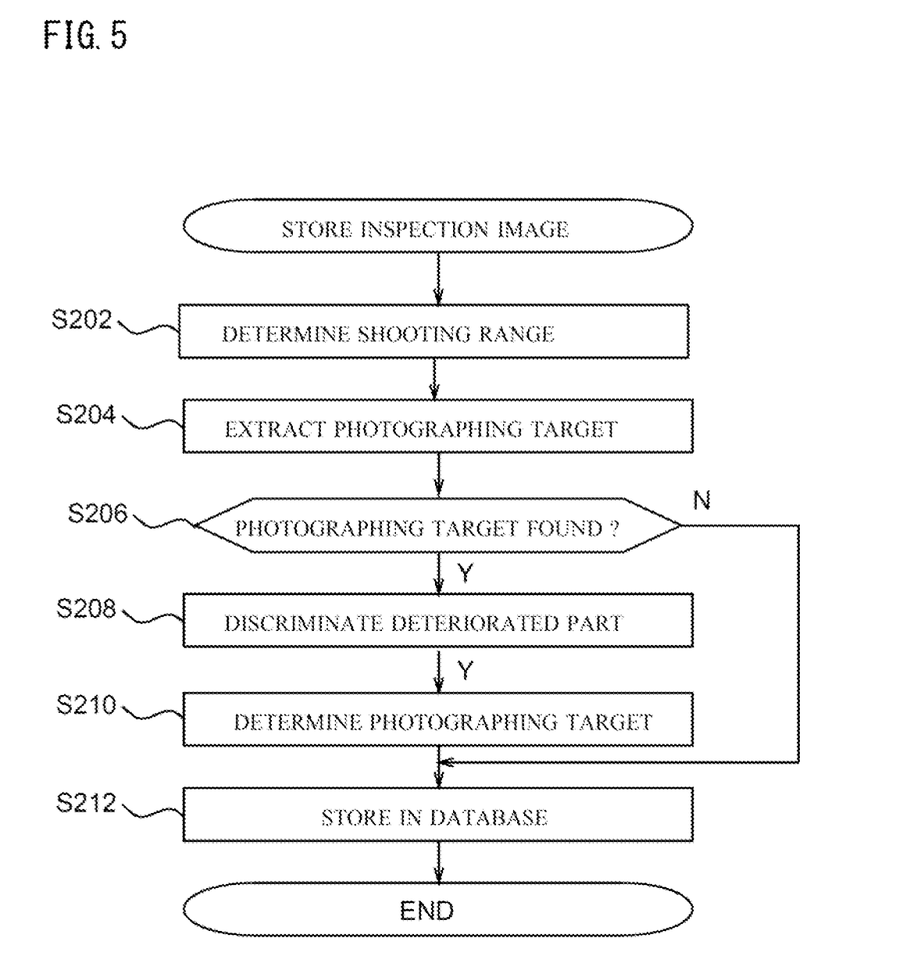
FIG. 5 is a flow chart illustrating processing procedures of the information processing apparatus that stores the inspection image into a database.

FIG. 5 is a flow chart illustrating processing procedures of the information processing apparatus 200 that stores the inspection image into the database 300.

In step S202, the information processing apparatus 200 specifies what region in the map data of the structure A was captured in the inspection image received from the self-traveling apparatus 100, on the basis of the environment information added to the inspection image (particularly, position information that indicates the estimated own position of the self-traveling apparatus 100 at the point in time of shooting, the vector information that indicates the shooting direction, and the distance information that indicates the distance from the photographing unit 101 to the wall).

In step S204, the information processing apparatus 200 (image processing unit 202) extracts photographing targets from the inspection image received from the self-traveling apparatus 100. The photographing targets extracted here specifically mean targets (objects) to be analyzed collectively as one group in image analysis, and may be in other words objects discriminable from the background (wall face or floor face).

If the photographing targets were not extracted in step S204 (NO in step S206), the flow advances to step S212.

On the other hand, if the photographing targets were extracted in step S204 (YES in step S206), the flow advances to step S208.

In step S208, the information processing apparatus 200 (image processing unit 202) determines whether the extracted photographing targets in step S204 are deteriorated parts or not. Now the deteriorated part may be exemplified by crack if a concrete wall is captured in the inspection image, may be exemplified by rust if a metal member is captured in the inspection image, and may be exemplified by peeling or lifting of paint if a painted wall (mortar wall, etc.) is captured in the inspection image.

In step S210, the information processing apparatus 200 (identification information processing unit 203) adds identification information to each of the photographing targets extracted in step S204, for enabling mutual identification.

The information processing apparatus 200 (identification information processing unit 203) stores the inspection image into the database 300, while correlating various information produced by processing in the aforementioned step S202 to step S210 (position information of the shooting range, presence or absence of the photographing targets, whether the photographing targets are deteriorated parts or not, and identification information of the photographing targets) with the inspection image and the photographing targets captured in the inspection image.

Now the processing having been explained referring to FIG. 5 will further be detailed, on the basis of specific examples.

Figure 6:
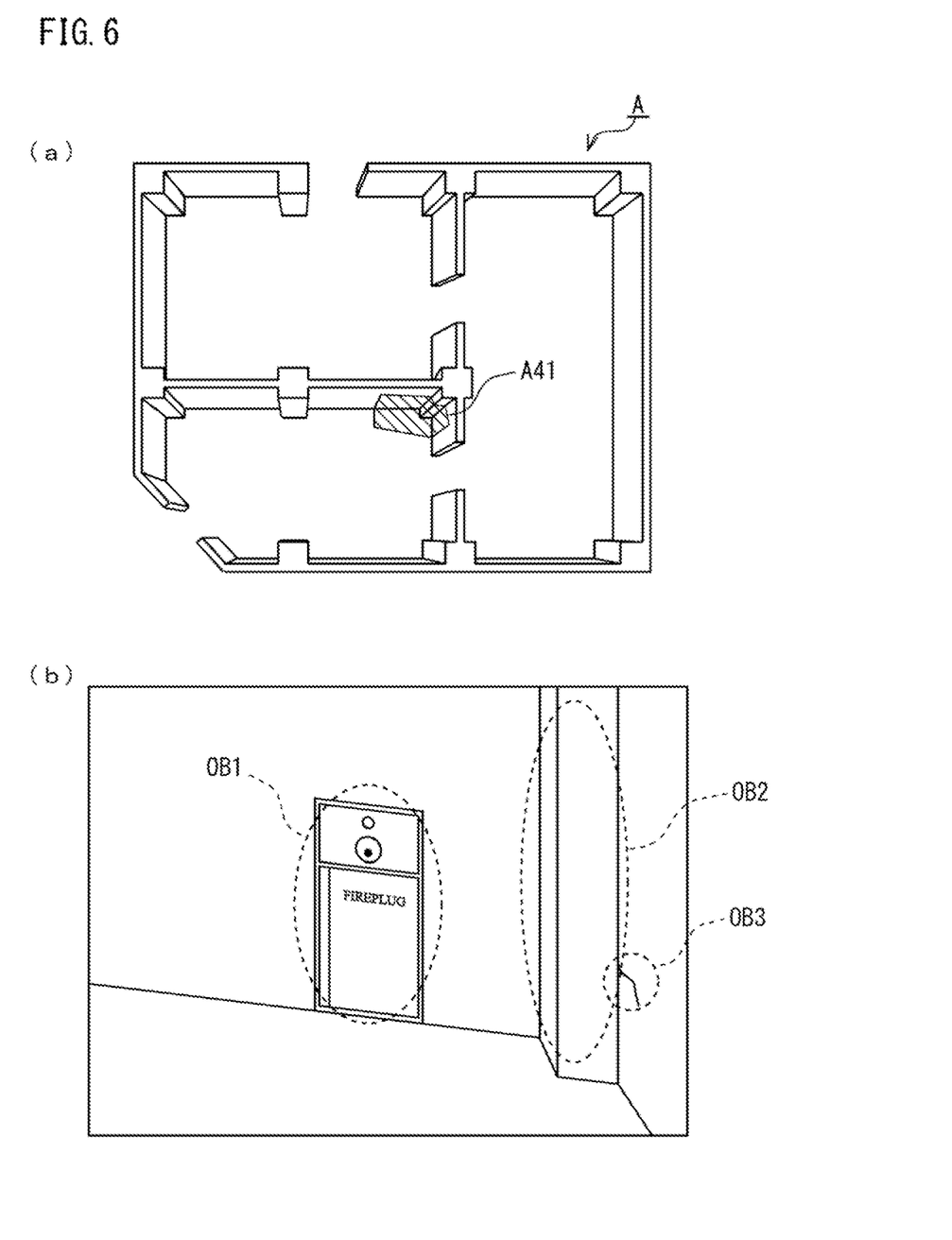

FIG. 6(b) is a drawing illustrating an inspection image T1 shot from position P4 in one inspection operation.

Assuming now that the shooting range of the inspection image T1 is identified as a shooting range R41 illustrated in FIG. 6(a), by the processing in step S202. Also assuming now that the information processing apparatus 200 (image processing unit 202) extracts a photographing target OB1 (fireplug), a photographing target OB2 (pillar of structure A), and a photographing target OB3 (crack) from the inspection image T1, as a result of processing in step S204.

In the processing in step S208 in this case, the information processing apparatus 200 (image processing unit 202) determines each of the photographing target OB1 and the photographing target OB2 not as a deteriorated part, and determines the photographing target OB3 as a deteriorated part.

Meanwhile in the processing in step S210, it is assumed that the information processing apparatus 200 (identification information processing unit 203) adds different identification information (ID number) and the individual position information to the photographing targets OB1 to OB3. Now the position information added to the photographing targets may be identified as a single point (single point data) or as a range (a plurality of point data).

Assuming next that an inspection image T2 is shot in an inspection which will be implemented after the elapse of a certain period of time from the inspection by which the inspection image T1 in FIG. 6(b) has been shot.

The information processing apparatus 200 in this timing transmits, to the self-traveling apparatus 100, a travel command that specifies the position P4 as a target position from which the photographing targets OB1 to OB3 having been captured in the inspection image T1 can be shot.

The timing when the information processing apparatus 200 transmits the travel command to the self-traveling apparatus 100 may be a timing when the next target position is identified in response to a request from the self-traveling apparatus 100 that has autonomously traveled to the position P3 and has completed shooting, or may be a timing when the next target position is identified in response to the self-traveling apparatus 100 in the initial state (initial point in time of inspection).

The self-traveling apparatus 100 autonomously travels to the position P4 in response to the travel command, and acquires an inspection image T2. It is presupposed herein that the shooting range of the inspection image T2 (range identified in step S202) is determined as a shooting range R42 (see FIG. 7(a)).

Figure 7:
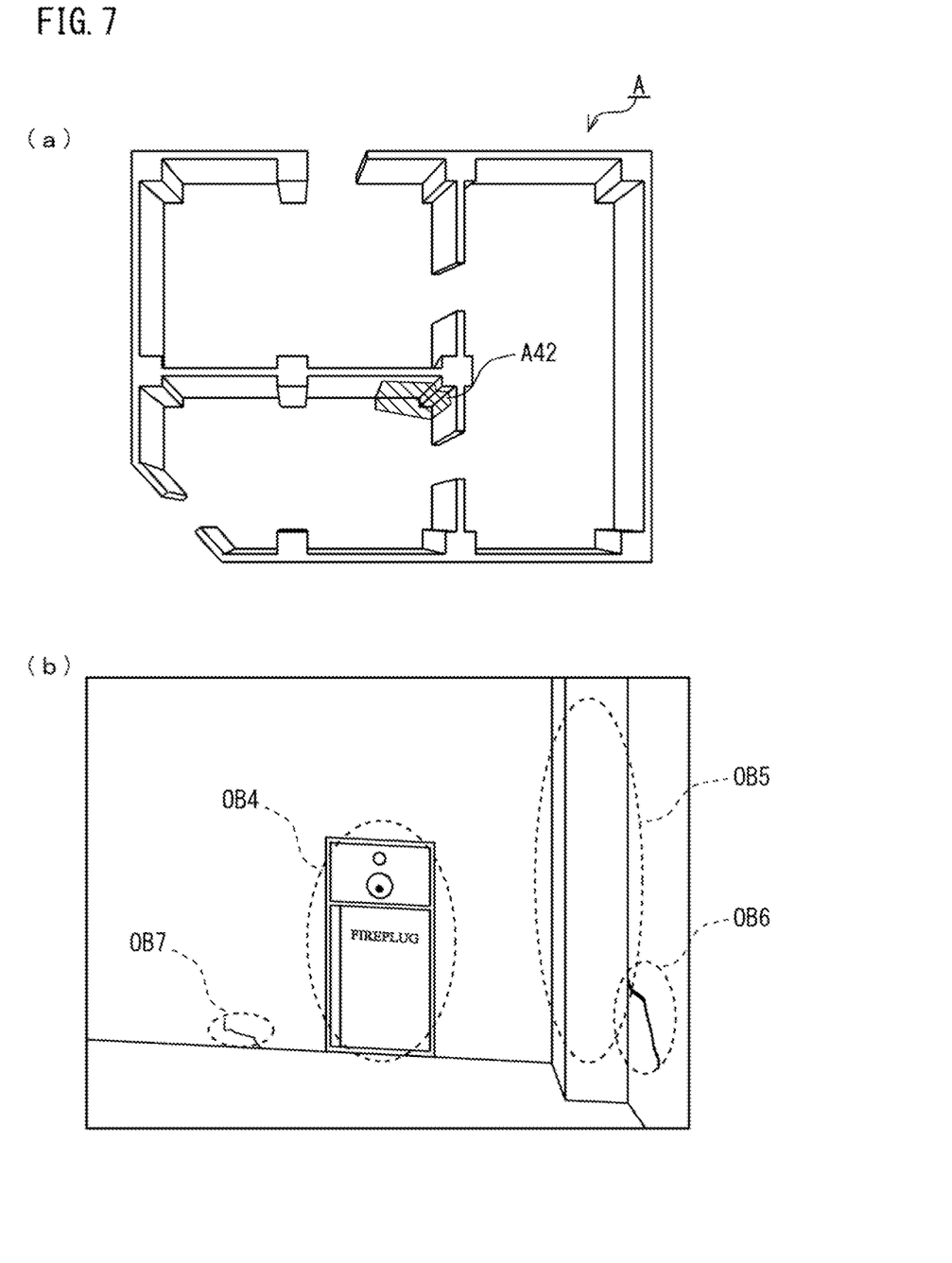

As is understood from comparison between FIG. 6(a) and FIG. 7(a), the shooting range R41 and the shooting range R42 are likely to represent slightly different ranges. This is because error in accuracy of autonomous travel control for the self-traveling apparatus 100 would occur in the order of several centimeters, and an actual shooting position would be different even if the same position were identified as the target position of the self-traveling apparatus 100. This is also because that shooting direction of the photographing unit 101 capable of covering the photographing targets OB1 to OB3 would vary, depending on the degree of approach angle of the self-traveling apparatus 100 relative to the target position.

Assuming now that information processing apparatus 200 (image processing unit 202) extracts a photographing target OB4 (fireplug), a photographing target OB5 (pillar of structure A), a photographing target OB6 (crack), and a photographing target OB7 (crack) from the inspection image T2 that captures the aforementioned shooting range R42, as a result of processing in step S204.

Since now the photographing target OB4 has almost the same shape as the photographing target OB1, and the photographing target OB5 has almost the same shape as the photographing target OB2, so that the information processing apparatus 200 (image processing unit 202) extracts the photographing target OB4 as a target (matched target) that matches the photographing target OB1, and extracts the photographing target OB5 as a target (matched target) that matches the photographing target OB2.

Hence, the information processing apparatus 200 (identification information processing unit 203) adds the identification information having been given to the photographing target OB1 also to the photographing target OB4, and adds the identification information having been given to the photographing target OB2 also to the photographing target OB5.

In other words, the self-traveling apparatus 100 is understood to autonomously travel to the target position in response to the received first travel command (travel command based on inspection image T1), and to shoot the photographing targets captured in the first inspection image (inspection image T1) to acquire the second inspection image (inspection image T2).

The image processing unit 202 at this time is understood to extract the matched targets (photographing target OB4 and photographing target OB5) that match the photographing targets (photographing target OB1 and photographing target OB2) having been captured in the first inspection image, out from the photographing targets captured in the second inspection image. The identification information processing unit 203 is understood to correlate the identification information of the photographing targets captured in the first inspection image that matches the matched targets, to the matched targets.

In this way, the information (identification information) that specifies the photographing targets captured in the inspection image T1, which supports the autonomous travel control for the shooting, are correlated with the photographing targets captured in the later-shot inspection image T2.

Hence, even in a case where the preliminarily-shot photographing targets and the later-shot photographing targets have been shot at different angles, an inspector is no longer necessary to determine whether the photographing targets are same or different, making it possible to improve work efficiency or work accuracy in inspection, whereby the work efficiency or work accuracy in inspection may be improved.

In addition, the photographing target OB6, although having a shape different from that of the photographing target OB3, is analyzable as a crack by image analysis similarly to the photographing target OB3 on the basis of shape, color and so forth, also showing that their positions almost coincide. The information processing apparatus 200 (image processing unit 202) therefore estimates that the photographing target OB6 is a result of progress of the photographing target OB3, and extracts the photographing target OB6 considering that both match to each other (both are matched targets).

Hence, the information processing apparatus 200 (identification information processing unit 203) adds the identification information having been given to the photographing target OB3, to the photographing target OB6.

In other words, the image processing unit 202 is understood to compare the second deteriorated part (photographing target OB6) that is extracted from the photographing targets captured in the second inspection image (inspection image T2), with the first deteriorated part (photographing target OB3) that is extracted from the photographing targets captured in the first inspection image (inspection image T1), and if both match to each other, then to extract the second deteriorated part as the matched target from among the photographing targets captured in the second inspection image. In addition, the identification information processing unit 203 is understood to correlate the identification information of the first deteriorated part, to the extracted second deteriorated part.

The image processing unit 202 at this time is understood to implement the estimation process so as to estimate whether the second deteriorated part is a result of progress of the first deteriorated part or not, by comparing the second deteriorated part (photographing target OB6) with the first deteriorated part (photographing target OB3), and if the estimation process is affirmed, then to extract the second deteriorated part as the matched target with respect to the first deteriorated part.

In this way, even with respect to crack that can progress with time (shape or color can change), a state of deterioration found in earlier inspection can be very accurately correlated with a state of deterioration found in later inspection, thus making it possible to improve work efficiency or work accuracy in inspection.

On the other hand, the photographing target OB7 is analyzable by image analysis as a crack different from the photographing target OB6, and match with none of the photographing targets OB1 to OB3 captured in the inspection image T1. The information processing apparatus 200 (image processing unit 202) therefore extracts the photographing target OB7 as an unmatched target.

The information processing apparatus 200 (identification information processing unit 203) at this time adds the identification information different from the identification information having been given to the photographing targets OB1 to OB3, to the photographing target OB7. Note that, when adding the position information as the identification information to the photographing target OB7, the information processing apparatus 200 (identification information processing unit 203) preferably determines the position information to be added to the photographing target OB7, on the basis of the position information of peripheral photographing targets (in particular, photographing targets that are deemed to be stationary and not to be the deteriorated part (photographing target OB4 and photographing target OB5)). This is because the positional information of the photographing targets captured in the identical inspection image T2 preferably demonstrates a high level of matching, from the viewpoint of proper inspection.

More preferably, the information processing apparatus 200 (identification information processing unit 203) preferably determines the position information to be added to the photographing target OB7, while considering the target position (position information of the estimated own position) of the self-traveling apparatus 100 at the point in time of shooting the inspection image T2, and the shooting direction (vector information) of the photographing unit 101 at the point in time of shooting the inspection image T2. This is aimed at improving calculation accuracy of the position information.

In other words, the identification information processing unit 203 preferably determines the position information to be correlated with the unmatched targets (photographing target OB7), which do not apply to the matched targets from among the photographing targets captured in the second inspection image (inspection image T2), by using the position information to be correlated with the matched target (photographing target OB4, photographing target OB5) captured in the second inspection image.

Even more preferably, the identification information processing unit 203 determines the position information to be correlated with the unmatched target (photographing target OB7) from among the photographing targets captured in the second inspection image (inspection image T2), by using not only the position information to be correlated with the matched target captured in the second inspection image, but also the target position at the point in time of shooting the second inspection image, and also the shooting direction of the photographing unit 101 at the point in time of shooting the second inspection image.

Now it would be obvious without special explanation that the identification information (ID number), when added to the photographing target OB7, will be different from any of those added to the photographing targets OB1 to OB3.

Modified Example

The embodiment of this invention explained above may be modified in various ways, within the scope of purpose and achievement of this invention.

A modified example of this invention having not been explained will be mentioned below.

The constituents contained in the system configuration illustrated in FIG. 1 may be partially omitted, or any other constituent not having been illustrated may be added.

Other possible modifications are such that the information processing apparatus 200 may have a part of the constituents of the self-traveling apparatus 100, and such that the self-traveling apparatus 100 may have a part of the constituents of the information processing apparatus 200.

A part of the procedures (steps) contained in the flowcharts of FIG. 4 and FIG. 5 may be omitted, or any other constituent not having been illustrated may be added.

Note that the illustrated procedures are merely specific examples, so that possible modifications include change of order of processes within a scope that would not cause any hindrance, or replacement of serial processes with parallel processes.

Although having explained that the conditions for retrieval by the retrieval unit 204 are not specifically limited, the retrieval when aimed at deterioration diagnosis of the structure, is preferably implemented by using the inspection image with the deteriorated part captured therein, as the conditions for retrieval.

In other words, the retrieval unit 204 is preferably able to retrieve the inspection image, having captured therein the deteriorated parts as the photographing targets, stored in the database 300 as the first inspection image, and the self-traveling apparatus 100 is preferably able to autonomously travel to the target position in response to the travel command (first travel command) based on the first inspection image, and to shoot the photographing targets captured in the first inspection image to acquire the second inspection image.

Various types of image processing by the image processing unit 202 may alternatively be implemented by machine learning that uses, as training data, the inspection image stored in the database 300.

The machine learning is particularly beneficial for the estimation process that determines whether the deteriorated part captured in the later-shot inspection image is a result of progress of the deteriorated part captured in the preliminarily-shot inspection image.

A process based on the machine learning is beneficial also for a process that determines whether the photographing target extracted from the inspection image is a deteriorated part occurred in the structure or not.

This embodiment encompasses the technical spirits below.

(1) An inspection support system that acquires an inspection image by using a self-traveling apparatus which is designed to be self-travelable in response to a received travel command, and has mounted thereon a photographing unit for photographing an inspection image used for inspection of a structure, and stores the acquired inspection image into a database, the system includes:

an image processing unit that extracts, from the inspection image to be stored into the database, one or a plurality of photographing targets captured in the inspection image;

an identification information processing unit that correlates identification information, which identifies each of the extracted photographing targets in an identifiable manner, with the photographing targets, a retrieval unit that retrieves a first inspection image, from among the inspection images stored in the database; and a command generation unit that generates a first travel command that makes the self-traveling apparatus run to a target position where the photographing target, captured in the first inspection image retrieved by the retrieval unit, can be shot;

the self-traveling apparatus autonomously traveling in response to the received first travel command to the target position, and shooting the photographing targets captured in the first inspection image, to acquire a second inspection image, the image processing unit extracting, from among the photographing targets captured in the second inspection image, a matched target that matches the photographing targets captured in the first inspection image, and the identification information processing unit correlating the identification information of the photographing targets that are captured in the first inspection image and are matched to the matched target, with the matched target.

(2) The inspection support system according to (1), wherein the image processing unit can discriminate whether the extracted photographing target is a deteriorated part occurred in the structure or not, the image processing unit compares a second deteriorated part that is extracted from the photographing targets captured in the second inspection image, with a first deteriorated part extracted from the photographing targets captured in the first inspection image, and if matched, then extracts, as the matched target, the second deteriorated part from among the photographing targets captured in the second inspection image, and the identification information processing unit correlates the identification information of the first deteriorated part, with the extracted second deteriorated part.

(3) The inspection support system according to (2), wherein the image processing unit implements an estimation process, by comparing the second deteriorated part and the first deteriorated part, to estimate whether the second deteriorated part is a result of progress of the first deteriorated part or not, and if the estimation process is affirmed, then extracts the second deteriorated part as the matched target with respect to the first deteriorated part.

(4) The inspection support system according to (3), wherein the estimation process by the image processing unit is implemented on the basis of machine learning that uses, as a training data, the inspection image stored in the database.

(5) The inspection support system according to any one of (1) to (4), wherein the identification information processing unit:

correlates, as the identification information, position information of the photographing targets in the structure, with the photographing targets extracted from the inspection image; and determines position information to be correlated with an unmatched target not applicable to the matched target, from among the photographing targets captured in the second inspection image, with use of position information to be correlated with the matched target captured in the second inspection image.

(6) The inspection support system according to (5), wherein the identification information processing unit determines the position information to be correlated with the unmatched target, from among the photographing targets captured in the second inspection image, with use of the target position at a point in time when the second inspection image was shot, and a shooting direction of the photographing unit at a point in time when the second inspection image was shot, in addition to the position information to be correlated with the matched target captured in the second inspection image.

(7) The inspection support system according to any one of (1) to (6), wherein the image processing unit can discriminate whether the extracted photographing target is a deteriorated part occurred in the structure or not, and the retrieval unit can retrieve, as the first inspection image, an inspection image in which the photographing target is the deteriorated part, from among the inspection images stored in the database.

(8) The inspection support system according to (7), wherein discrimination of the deteriorated part by the image processing unit is implemented on the basis of machine learning that uses, as training data, the inspection image stored in the database.

The invention claimed is:

1. An inspection support system that acquires an inspection image by using a self-traveling apparatus which is designed to be self-travelable in response to a received travel command, and has mounted thereon a photographing unit for photographing an inspection image used for inspection of a structure, and stores the acquired inspection image into a database, comprising:

an image processing unit that extracts, from the inspection image to be stored into the database, one or a plurality of photographing targets captured in the inspection image, and is configured to discriminate whether the extracted photographing target is a deteriorated part occurred in the structure;

an identification information processing unit that correlates position information of every photographing target in the structure, as the identification information, which identifies each of the extracted photographing targets in an identifiable manner, with each photographing targets, a retrieval unit that retrieves a first inspection image, from among the inspection images stored in the database; and a command generation unit that generates a first travel command that makes the self-traveling apparatus run to a target position where the photographing target, captured in the first inspection image retrieved by the retrieval unit, can be shot;

the self-traveling apparatus autonomously traveling in response to the received first travel command to the target position, and shooting the photographing targets captured in the first inspection image, to acquire a second inspection image, the image processing unit extracting, from among the photographing targets captured in the second inspection image, a matched target that matches the photographing targets captured in the first inspection image, and the identification information processing unit correlating the identification information of the photographing targets that are captured in the first inspection image and are matched to the matched target, with the matched target, if the photographing target extracted from the second inspection image is found to contain a second deteriorated part, the image processing unit implements an estimation process, by comparing a first deteriorated part contained in the photographing target extracted from the first inspection image with the second deteriorated part, on the basis of the individual shapes, colors, and positions, to estimate whether the second deteriorated part is a result of progress of the first deteriorated part or not, if the estimation process is affirmed, the image processing unit extracts the second deteriorated part as the matched target that matches the first deteriorated part, and the identification information processing unit adds, as the identification information for the extracted second deteriorated part, position information having been added as the identification information for the first deteriorated part, and if the estimation process is denied, the image processing unit extracts the second deteriorated part as an unmatched target that does not match the first deteriorated part, and the identification information processing unit adds, as the identification information for the extracted second deteriorated part, position information that is determined on the basis of the position information having been given as the identification information for other photographing target not having been determined to be a deteriorated part.

2. The inspection support system according to claim 1, wherein
   the estimation process by the image processing unit is implemented on the basis of machine learning that uses, as a training data, the inspection image stored in the database.

3. The inspection support system according to claim 1, wherein
   the identification information processing unit determines the position information to be correlated with the unmatched target from among the photographing targets captured in the second inspection image, by using not only the position information to be correlated with the matched target captured in the second inspection image, but also the target position at a point in time of shooting the second inspection image, and also the shooting direction of the photographing unit at a point in time of shooting the second inspection image.

4. The inspection support system according to claim 1, wherein
   the image processing unit is configured to discriminate whether the extracted photographing target is a deteriorated part occurred in the structure, and
   the retrieval unit is configured to retrieve, as the first inspection image, an inspection image in which the photographing target is the deteriorated part, from among the inspection images stored in the database.

5. The inspection support system according to claim 4, wherein discrimination of the deteriorated part by the image processing unit is implemented on the basis of machine learning that uses, as training data, the inspection image stored in the database.

\* \* \* \* \*